US011057637B1

(12) United States Patent
Levi et al.

(10) Patent No.: US 11,057,637 B1
(45) Date of Patent: Jul. 6, 2021

(54) EFFICIENT VIDEO MOTION ESTIMATION BY REUSING A REFERENCE SEARCH REGION

(71) Applicants: Mellanox Technologies, Ltd., Yokneam (IL); BEAMR IMAGING LTD., Tel Aviv (IL)

(72) Inventors: Dotan David Levi, Kiryat Motzkin (IL); Assaf Weissman, Moreshet (IL); Ohad Markus, Haifa (IL); Uri Gadot, Haifa (IL); Aviad Raveh, Bat Hefer (IL); Tamar Shoham, Netanya (IL)

(73) Assignees: MELLANOX TECHNOLOGIES, LTD., Yokneam (IL); BEAMR IMAGING LTD., Tel Aviv (IL)

( * ) Notice: Subject to any disclaimer, the term of this patent is extended or adjusted under 35 U.S.C. 154(b) by 0 days.

(21) Appl. No.: 16/775,463

(22) Filed: Jan. 29, 2020

(51) Int. Cl.
*H04N 19/52* (2014.01)
*H04N 19/177* (2014.01)
*H04N 19/176* (2014.01)

(52) U.S. Cl.
CPC .......... *H04N 19/52* (2014.11); *H04N 19/176* (2014.11); *H04N 19/177* (2014.11)

(58) Field of Classification Search
USPC .................................................. 375/240.16
See application file for complete search history.

(56) References Cited

U.S. PATENT DOCUMENTS

| 5,796,434 | A | * | 8/1998 | Lempel | .................. | G06T 7/262 |
| | | | | | | 348/403.1 |
| 6,845,130 | B1 | * | 1/2005 | Han | ..................... | H04N 19/513 |
| | | | | | | 375/240.16 |
| 8,098,733 | B2 | | 1/2012 | Veremeev et al. | | |
| 9,762,919 | B2 | | 9/2017 | Cote et al. | | |
| 2008/0285652 | A1 | | 11/2008 | Oxman et al. | | |
| 2009/0103621 | A1 | * | 4/2009 | Numata | ............... | H04N 19/172 |
| | | | | | | 375/240.16 |
| 2010/0091862 | A1 | * | 4/2010 | Kuo | ....................... | H04N 19/56 |
| | | | | | | 375/240.16 |
| 2011/0182356 | A1 | * | 7/2011 | Ammu | .................. | H04N 19/14 |
| | | | | | | 375/240.03 |
| 2014/0092969 | A1 | | 4/2014 | Lee et al. | | |
| 2014/0219355 | A1 | | 8/2014 | Goto et al. | | |
| 2017/0289566 | A1 | * | 10/2017 | He | ......................... | H04N 19/52 |
| 2020/0014918 | A1 | | 1/2020 | Levi et al. | | |

(Continued)

FOREIGN PATENT DOCUMENTS

| CN | 101102493 A | 1/2008 |
| CN | 103634604 A | 3/2014 |

*Primary Examiner* — Behrooz M Senfi
(74) *Attorney, Agent, or Firm* — Kligler & Associates Patent Attorneys Ltd

(57) ABSTRACT

A video processor includes a memory and a processor. The processor is coupled to memory and is configured to store in the memory (i) multiple raw frames belonging to a Group of Pictures (GOP) to be processed, and (ii) one or more reference frames. The processor is further configured to select for multiple target blocks having a same block-location in respective raw frames associated with a common reference frame, a common search region in the common reference frame, and before selecting another search region, to apply at least two motion estimation operations using at least two of the target blocks and the common search region, to estimate respective at least two Motion Vectors (MVs).

16 Claims, 7 Drawing Sheets

(56) References Cited

U.S. PATENT DOCUMENTS

2020/0014945 A1    1/2020  Levi et al.
2020/0154129 A1*   5/2020  Su .......................... H04N 19/423
2020/0228796 A1*   7/2020  Seregin .................. H04N 19/70

* cited by examiner

EFFICIENT VIDEO MOTION ESTIMATION BY REUSING A REFERENCE SEARCH REGION

TECHNICAL FIELD

Embodiments described herein relate generally to video encoding, and particularly to efficient motion estimation in video encoding by reusing search region in a reference frame.

BACKGROUND

Video encoders typically use motion-compensation prediction methods for exploiting temporal information redundancy among video frames.

Methods for video encoding using motion-compensation prediction are known in the art. For example, U.S. Patent Application Publication 2814/0092969 describes a method and apparatus of data reduction of search range buffer for motion estimation or motion compensation. The method and apparatus use local memory to store reference data associated with search region to reduce system bandwidth requirement and use data reduction to reduce required local memory. The data reduction technique is also applied to intermediate data in a video coding system to reduce storage requirement associated with intermediate data. The data reduction technique is further applied to reference frames to reduce storage requirement for coding system incorporating picture enhancement processing to the reconstructed video.

U.S. Pat. No. 9,762,919 describes methods and apparatus for caching reference data in a block processing pipeline. A cache may be implemented to which reference data corresponding to motion vectors for blocks being processed in the pipeline may be prefetched from memory. Prefetches for the motion vectors may be initiated one or more stages prior to a processing stage. Cache tags for the cache may be defined by the motion vectors. When a motion vector is received, the tags can be checked to determine if there are cache block(s) corresponding to the vector (cache hits) in the cache. Upon a cache miss, a cache block in the cache is selected according to a replacement policy, the respective tag is updated, and a prefetch (e.g., via DMA) for the respective reference data is issued.

SUMMARY

An embodiment that is described herein provides a video processor that includes a memory and a processor. The processor is coupled to memory and is configured to store in the memory (i) multiple raw frames belonging to a Group of Pictures (GOP) to be processed, and (ii) one or more reference frames. The processor is further configured to select for multiple target blocks having a same block-location in respective raw frames associated with a common reference frame, a common search region in the common reference frame, and before selecting another search region, to apply at least two motion estimation operations using at least two of the target blocks and the common search region, to estimate respective at least two Motion Vectors (MVs).

In some embodiments, the processor is configured to produce a video bitstream by applying residual coding to the at least two of the target blocks and corresponding predicted blocks determined based on the at least two MVs. In other embodiments, the video processor includes a cache memory, and the processor is configured to load the at least two of the target blocks and the common search region from the memory into the cache memory, and before loading another search region into the cache memory, to apply the at least two motion estimation operations using at least two of the cached target blocks and the cached common search region. In yet other embodiments, the processor is configured to complete encoding the at least two of the target blocks after performing the at least two motion estimation operations for the at least two of the target blocks using search regions belonging to other respective reference frames.

In an embodiment, the processor includes multiple processing cores, and the multiple processing cores are configured to apply, in parallel, multiple motion estimation operations among the at least two motion estimation operations. In another embodiment, the processor is configured to apply first and second motion estimation operations among one or more of the at least two motion estimation operations, in the common search region, at different respective first and second times. In yet another embodiment, the video processor includes a coprocessor coupled to the processor, and the coprocessor is configured to offload the at least two or more motion estimation operations from the processor.

In some embodiments, the processor is configured to calculate a first MV for a first target block in a first target frame relative to the common search region in the common reference frame, to select based on the first MV a search region in the common reference frame for a second target block in a second target frame closer to the reference frame than the first target frame, and to calculate a second MV for the second target block by performing a guided motion estimation search in the selected search region. In another embodiment, the processor is configured to select the common search region in a raw frame serving as reference frame, to estimate respective MVs for the at least two of the target blocks in the common search region in the raw frame, to produce a reconstructed frame corresponding to the raw frame, and to calculate refined versions of the MVs based on the produced reconstructed frame.

There is additionally provided, in accordance with an embodiment that is described herein, a method, including storing in a memory (i) multiple raw frames belonging to a Group of Pictures (GOP) to be processed by a video processor, and (ii) one or more reference frames. For multiple target blocks having a same block-location in respective raw frames associated with a common reference frame, a search region is selected in the common reference frame. Before selecting another search region, at least two motion estimation operations are applied using at least two of the target blocks and the common search region, to estimate respective at least two Motion Vectors (MVs).

These and other embodiments will be more fully understood from the following detailed description of the embodiments thereof, taken together with the drawings in which:

DETAILED DESCRIPTION OF EMBODIMENTS

Overview

Figure 1:
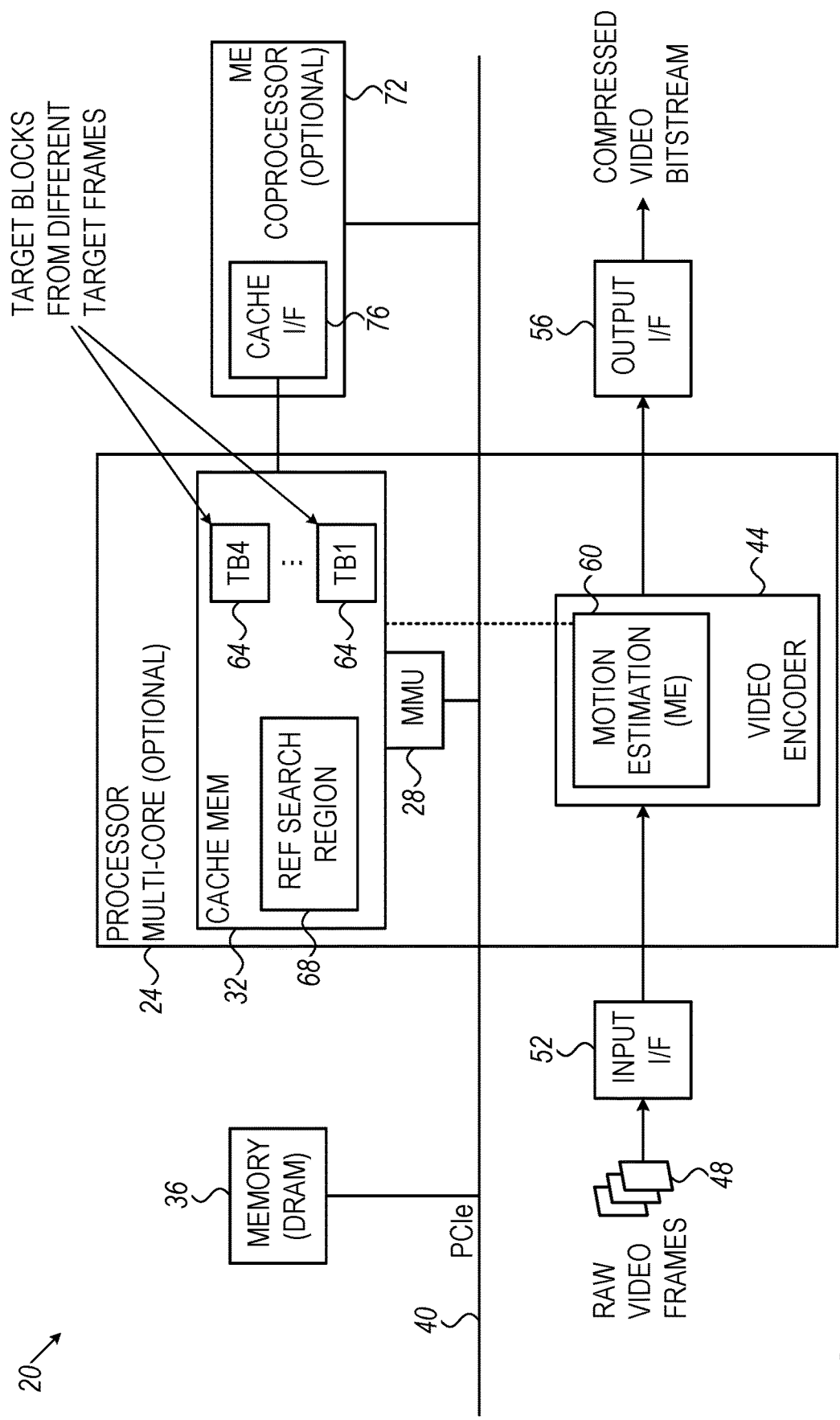
FIG. 1 is a block diagram that schematically illustrates a video encoding system in which a reference search region is used in performing Motion Estimation (ME) for multiple target blocks, in accordance with an embodiment that is described herein.

Embodiments that are described herein provide methods and systems that perform efficient motion estimation in video encoding by reusing a reference search region for multiple target blocks in multiple respective target frames.

The disclosed embodiments are applicable to any hybrid video encoder and are not limited to specific video encoding standards. The disclosed embodiments are applicable, for example, to video encoding standards such as AVC/H.264, HEVC/H.265, Av-1, VP-9 and VVC/H.266. The disclosed embodiments are also applicable in video processing tasks other than video encoding such as, for example, video transcoding.

The embodiments that will be described below utilize hybrid block-based video compression techniques, in which temporal redundancy among video frames is exploited using motion-compensated prediction methods. A target frame to be encoded is divided into blocks of pixels, and each block is decomposed into a prediction block and a residual block. The prediction block is produced from a reference block in a reference frame (past or future) that was previously encoded and reconstructed.

Methods for searching a reference block that best matches the block being encoded are generally referred to as "Motion Estimation" (ME) methods. The block being encoded is also referred to as a "current block" or a "target block." The block in the reference frame that best matches the target block is also referred to as a "matching block." A matching criterion may comprise any suitable error measure such as, for example, the Mean Squared Error (MSE) criterion, the Sum of Absolute Differences (SAD) criterion or the Sum of Absolute Transform Difference (SATD) criterion.

In the embodiments that will be described below, an ME search operation produces a Motion Vector (MV) that specifies the horizontal and vertical displacements between the target block and its matching block in the reference frame. The residual block is calculated as the difference between the target block and the motion-compensated matching block, using the respective MV. The target block is then efficiently compressed and encoded including information specifying the current block-location in the target frame, reference frame index, MV to the matching block and information related to the residual block. Searching for a matching block in ME may be carried out in various ways and is typically vendor dependent.

In conventional video encoding schemes, an MV is estimated for a target block based on a relevant reference search region, and the target block is encoded using the MV. Then, another MV is estimated for another target block based on another reference search region. Encoding schemes of this sort suffer from several drawbacks as described herein. First, to perform a ME search operation, a conventional video encoder stores in memory (or in a cache memory) a target block and multiple search regions from multiple respective reference frames. Since the search region is relatively large (e.g., much larger than the target blocks), this requires large storage space, which may reduce the video encoding performance. Note that the amount of data in memory or cache memory used for performing a ME search operation is a critical parameter that affects the video visual quality, and therefore is considered a bottleneck in selecting a tradeoff between quality and compressibility. When using a single search region rather than multiple search regions, in a fast cache memory having a given storage-space, the search region may be increased to improve quality. Second, when performing a ME search operation on cached data, a large cache memory space is required for the multiple search regions, which increases costs. Moreover, a search region in the cache memory is used for performing a ME search operation for only one target block, and then replaced, which incurs high memory bandwidth.

Unlike conventional video encoding schemes, in the disclosed embodiments, ME search operations are applied to multiple target blocks using a common search region in a reference frame, before selecting another search region.

In an embodiment, a video encoder (or some other video processor), comprises a memory and a processor coupled to the memory. The processor is configured to store in the memory (i) multiple raw frames (Each frame comprising multiple pixels) belonging to a Group of Pictures (GOP) to be processed, and (ii) one or more reference frames. A reference frame comprising the pixels of a previously encoded and then decoded and reconstructed frame in a buffer often labeled as a Decoded Picture Buffer (DPB). The processor is further configured to select for multiple target blocks having a same block-location in respective raw frames associated with a common reference frame, a search region in the common reference frame. Before selecting another search region, the processor applies at least two motion estimation operations using at least two of the target blocks belonging to different target frames and the common search region, to produce respective at least two MVs associated with respective matching blocks found in the search region. In some embodiments, the processor produces a video bitstream by applying residual coding to the at least two of the target blocks and corresponding predicted blocks. The processor calculates each of the residual blocks as a difference between a target block and a corresponding predicted block obtained using the MV found and corresponding matching block determined based on the at least two MVs.

In some embodiments, the video encoder comprises a cache memory that temporarily stores data for ME calculations. The cache memory is faster than the memory and therefore suitable for accelerating ME calculations. The cache memory, however, is typically much more expensive than the main memory and is therefore limited in size. In such embodiments, the processor is configured to load the at least two of the target blocks and the common search region from the memory into the cache memory. Before loading another search region into the cache memory, the processor applies the at least two motion estimation operations using at least two of the cached target blocks and the cached common search region. In these embodiments, the required cache memory size is reduced, compared to the conventional approach that would load into the cache memory multiple search regions, simultaneously. For example, the size reduces by about half assuming that two search regions are concurrently used in conventional video encoding.

In some embodiments, a target frame to be encoded has multiple reference frames, e.g., a Bi-directional frame. In these embodiments, encoding the target blocks is possible only when all ME information for these target blocks becomes available. In an embodiment, the processor completes encoding the at least two of the target blocks after performing the at least two motion estimation operations for the at least two of the target blocks using search regions belonging to other respective reference frames.

In an embodiment, the processor comprises multiple processing cores, configured to apply, in parallel, multiple motion estimation operations among the at least two motion estimation operations. By performing multiple ME search operations for multiple target block in parallel, latency is reduced significantly, and ME scaling improves.

In some embodiments, the processor is configured to apply first and second motion estimation operations among one or more of the at least two motion estimation operations, in the common search region, at different respective first and second times In some embodiments, the video encoder comprises a coprocessor coupled to the processor. The coprocessor offloads the tasks of motion estimation operations from the processor. The coprocessor may be implemented in hardware, software, or in combination of hardware and software.

In conventional video encoding schemes, because only one target frame is processed and encoded at a time, valuable temporal information related, for example, to a movement of an object along multiple frames cannot be extracted at affordable complexity.

In some embodiments, the processor is configured to calculate a first motion vector for a first target block in a first target frame relative to the common search region in the common reference frame, to select based on the first motion vector a search region in the common reference frame for a second target block in a second target frame closer to the reference frame than the first target frame, and to calculate a second MV for the second target block by performing a guided motion estimation search in the selected search region.

In some embodiments, the processor calculates MVs based on selected search regions in input raw frames serving as reference frames. This allows higher flexibility in performing motion estimation search operations. When the corresponding reconstructed frames become available, the processor may calculate refined versions of the MVs using the reconstructed frames.

The disclosed embodiments are applicable in various video encoder standards such as, for example, the AVC, HEVC and VVC standards. Different video encoding standards, however, may differ in various parameters, such as the block size used for prediction, supported block partitions, the number of reference frames used, the range of motion vectors supported, and the like. The main elements in the hybrid video encoder architecture, however, function similarly across different video encoding standards.

Some of the embodiments that will be described blow relate to accelerating video encoding and offloading the task of motion estimation. Aspects related to video encoding acceleration and to offloading video encoding tasks from a CPU are described, for example, in U.S. patent application Ser. No. 16/291,023, filed Mar. 4, 2019, and in U.S. patent application Ser. No. 16/442,581, filed Jun. 17, 2019.

In the disclose techniques, multiple ME search operations are applied to multiple target blocks in the same search region from a corresponding reference frame, before searching in another search region. By using the disclosed embodiments, multiple ME operations can be carried out in parallel, to reduce latency. Since only one search region is required, memory bandwidth is reduced. Moreover, the cache-miss rate reduces due to reducing the rate of loading search regions into the cache. The disclosed embodiments, allow extracting GOP-level temporal information that can be used in guided motion estimation, thus improving encoding efficiency.

System Description

FIG. 1 is a block diagram that schematically illustrates a video encoding system 20 in which a reference search region is used in performing Motion Estimation (ME) for multiple target blocks, in accordance with an embodiment that is described herein.

In the example of FIG. 1, video encoding system 20 comprises a processor 24, a Memory Management Unit (MMU) 28, and a cache memory 32. Processor 24 is coupled via a link 40 to an external memory 36. Link 40 may comprise any suitable bus or link, such as, for example, a Peripheral Component Interconnect Express (PCIe) link.

In the context of the present disclosure and in the claims, the term "cache memory" (e.g., cache memory 32) refers to a memory device that has a faster access time than the main memory (e.g., external memory 36). The cache memory typically resides closer to the processor than the main memory.

MMU 28 typically comprises a hardware module that handles all memory access operations for processor 24. MMU 28 translates between virtual addresses of a virtual address space used by processor 24 and physical addresses of memory devices such as cache memory 32 and external memory 36. Cache memory 32 has faster access time than external memory 36 but on the other hand is much more expensive. Cache memory 32 is therefore typically configured to a limited storage capacity to reduce costs and is suitable for storing small amounts of data that require extensive processing. The storage capacity of cache memory 32 may be on the order of several Megabits, e.g., 12 Megabits. The storage capacity of external memory 36 may be on the order of several Gigabits, e.g., between 8 and 64 Megabits. Alternatively, any other suitable storage capacities for the cache memory and the external memory can also be used.

Data is typically stored temporarily in cache memory 32. When data that requires extensive processing is unavailable in the cache memory (referred to as a cache miss event), MMU 28 loads that data from external memory 36 into the cache memory. Processor 24 may process the cached data and then replace it with other data.

In video encoding system 20, processor 24 runs a program or application that embodies video encoder 44. Video encoder 44 receives raw video frames 48 via an input interface 52, processes the raw frames to produce a video bitstream that carries a compressed and encoded version of the raw frames, and outputs the video bitstream via an output interface 56. The raw frames are typically classified into sequences of frames to be processed. A frame-sequence of this sort is also referred to as a Group of Pictures (GOP). The video encoder may receive the entire GOP for processing, or multiple subsets of the GOP frames in multiple batches.

Video encoder 44 may operate in accordance with any suitable video compression standard such as, for example, the Advanced Video Coding (AVC), also referred to as H.264 or MPEG-4 Part 10, the High Efficiency Video Coding (HEVC), also known as H.265 or MPEG-H Part 2, the VP9—an open video coding format developed by Google, the AOMedia Video 1 (AV1)—an open video coding format designed for video transmissions over the Internet, the Versatile Video Coding (VVC) (MPEG-I Part 3)—a future video compression standard being developed by the Joint Video Experts Team (JVET) and the MPEG-5 Essential Video Coding (EVC) standard.

Video encoding system 20 of FIG. 1 may be used in various applications such as video streaming, video encoding and formatting into a file, transmission of video content to/from mobile devices, generating compressed video content, e.g., for display via browsers, and the like.

Video encoder 44 executes, as part of the video compression operation, a Motion Estimation (ME) task 60. Since ME is a computationally expensive task, in some embodiments ME is applied to cached data rather than to data in the external memory. Unlike conventional video encoding schemes that encode one target frame at a time, in video encoder 44, multiple target frames are encoded using a common reference frame. In the present example, processor 24 loads four Target Blocks (TBs) 64 denoted TB1 . . . TB4 from external memory 36 into cache memory 32 along with a search region 68 from a corresponding reference frame. Search region 68 is significantly larger than target blocks 64. TB1 . . . TB4 respectively belong to four different target frames and have the same block-location. In some embodiments, ME 60 searches for respective matching blocks for TB1 . . . TB4 in search region 68, and only after performing the multiple ME search operations loads another search region (and TBs) into the cache memory. This scheme reduces the rate of loading search regions into the cache memory, and therefore also reduces cache-miss rate. This is true assuming that an object is not moving faster than a block width or height in a frame time, or more generally, that a matching block can be found in the same search region for the multiple TBs.

In some embodiments, processor 24 comprises a multicore processor. In such embodiments, the multiple processing core be used for searching, in parallel, (in search region 68) for multiple matching blocks that best match multiple respective target blocks 64. For example, a four-core processor may assign one processing core to perform a ME search operation for one TB among TB1 . . . TB4, and run the four processing cores in parallel.

In some embodiments, video encoding system 20 comprises a ME coprocessor 72 that has access to cache memory 32 via a cache interface 76. ME coprocessor 72 may be used for offloading part or all of the ME calculations from processor 24.

In the example of FIG. 1, motion estimation is applied to data cached in cache memory 32. In alternative embodiments, motion estimation may be applied to data stored in external memory 36.

A Video Encoder Employing Efficient Motion Estimation

Figure 2:
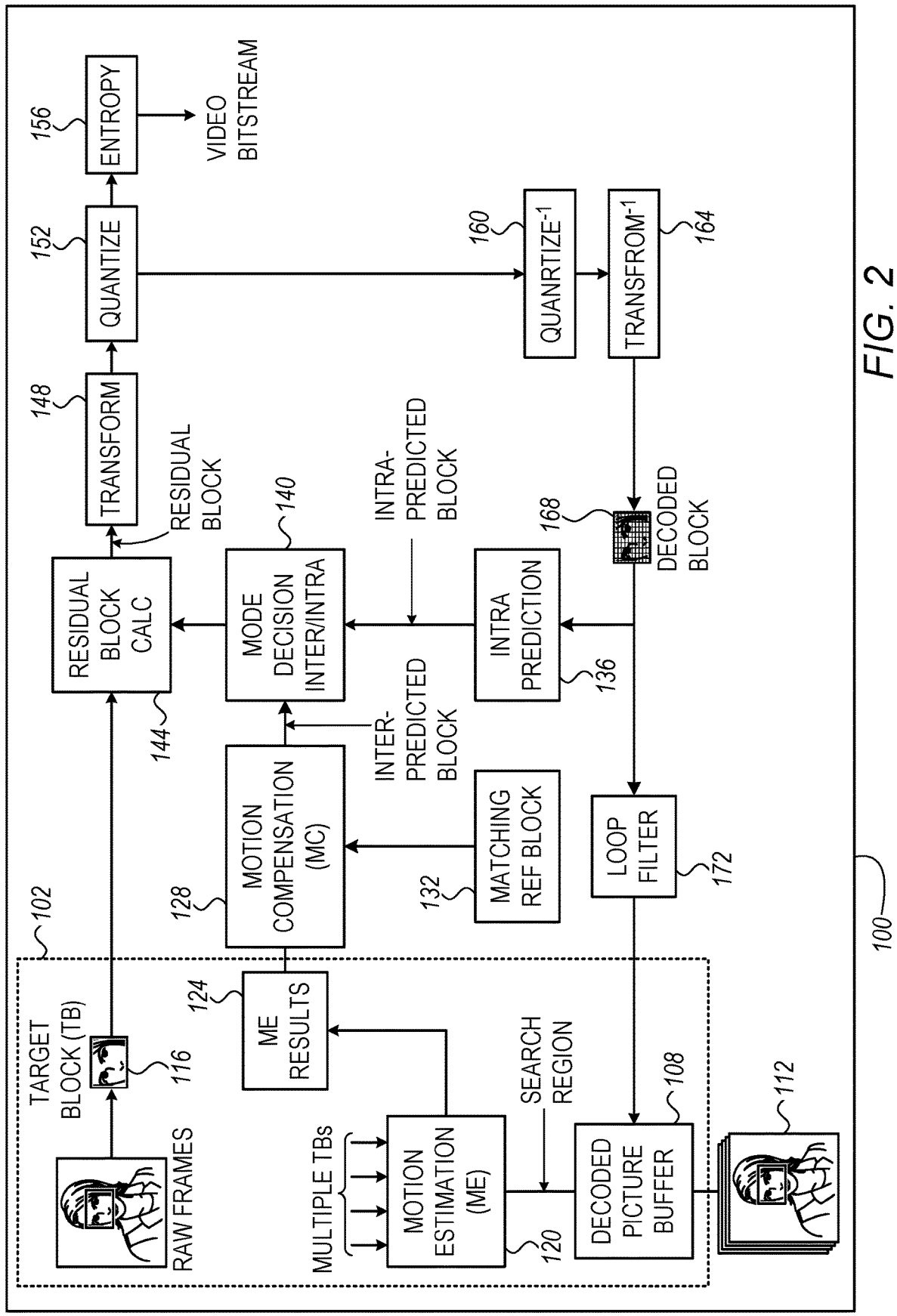
FIG. 2 is a block diagram that schematically illustrates a video encoder that employs an efficient ME scheme, in accordance with an embodiment that is described herein.

FIG. 2 is a block diagram that schematically illustrates a video encoder 100 that employs an efficient ME scheme, in accordance with an embodiment that is described herein.

Video encoder 100 may be used in implementing video encoder 44 of FIG. 1, e.g., executed by processor 24. The elements of video encoder 100 within dotted line box 102, focus on elements that differ in handling motion estimation compared to conventional video encoders.

Video encoder 100 receives raw video frames 104 for encoding. The frame size of raw frames 104 depends on the selected resolution. For example, in full High Definition (HD) video, the raw frame comprises 1920-by-1080 pixels.

Raw frames 48 may comprise one or more pixel-planes. The raw frames may be formatted using any suitable formatting method, such as, for example, the YUV or the YCbCr color encoding system, or the Red, Green and Blue (RGB) color system. The range of pixel values in each pixel-plane depends on the underlying formatting.

Video encoder 100 encodes raw frames in small units that are referred to as "blocks." In the HEVC standard, a block, called a Coding Tree Unit (CTU), may comprise 64-by-64 pixels. In the AVC (H.264) standard, a full-sized block is referred to as a "macroblock," which comprises 16-by-16 pixels. Video encoder 100 may scan the blocks in a given raw frame using any suitable order, e.g., from left to right and from top to bottom.

Video encoder 100 comprises a Decoded Picture Buffer (DPB) 108 for storing reconstructed frames 112 that may serve as reference frames in performing ME search operations. DPB 108 typically stores large amounts of data and therefore resides in external memory 36. Video encoder 100 produces each reconstructed frame from a frame that was already encoded, by applying to the encoded frame decompression and decoding operations.

Target Block (TB) 116 comprises a target block currently being encoded. In video encoder 100, as opposed to conventional ME schemes that calculate MVs for one target block in multiple search regions and then proceed to another target block and search regions, ME 120 searches in a common search region of a single reference frame, to find best-matching blocks for multiple TBs such as TB 116. Only after ME 120 produces ME results 124 for multiple TBs, the video encoder proceeds to another search region.

In some embodiments, for fast ME operation, the search region and multiple TBs are loaded from external memory 36 into cache memory 32. Using the multiple target block scheme of ME 120, a search region is loaded into the cache memory only once per multiple ME search operations for the respective TBs. ME results 124 comprise Motion Vectors (MVs) representing horizontal offsets and vertical offsets from the TBs to respective matching blocks in the search region of the reference frame.

Motion Compensation (MC) 128 calculates an Inter-predicted block for TB 116 based on a respective matching block 132 in the reference frame and on the respective MV in ME results 124. The Inter-predicted block is also referred to as a "motion-compensated block." In alternative embodiments, MC 128 applies motion compensation to TB 116 and not to matching block 132. An Intra-prediction module 136 produces an Intra-predicted block for a key frame starting a GOP, and possibly to selected blocks in other frames in the GOP. A mode decision module 140 directs the Inter-predicted block or the Intra-predicted block as input to a residual block calculation module 144, which produces a residual block by calculating the (pixel-wise) difference between TB 116 and the corresponding predicted block, over the block pixels in all pixel-planes.

A transform module 148 applies a suitable block transform (e.g., a Discrete Cosine Transform—DCT) to the residual block, a quantizer 152 quantizes the transformed block and an entropy encoder 156 further encodes the quantized data to produce the video bitstream in accordance with the formatting specified in the underlying video encoding standard. The entropy encoding applies any lossless data compression technique, such as, for example the Context-Adaptive Binary Arithmetic Coding (CABAC) entropy coding method.

An inverse quantizer 160 de-quantizes the quantized data and an inverse transform module 164 applies the inverse transform to the de-quantized data to produce a decoded block 168. A loop filter 172 applies a filtering operation to smooth sharp edges between adjacent decoded blocks that form a reference frame (112) in DPB 108.

The video encoding scheme described in FIG. 2, comprises a general hybrid video encoding scheme that can be used in implementing video encoders in accordance with various video encoding standards such as, for example, AVC, HEVC and VVC.

Figure 3:
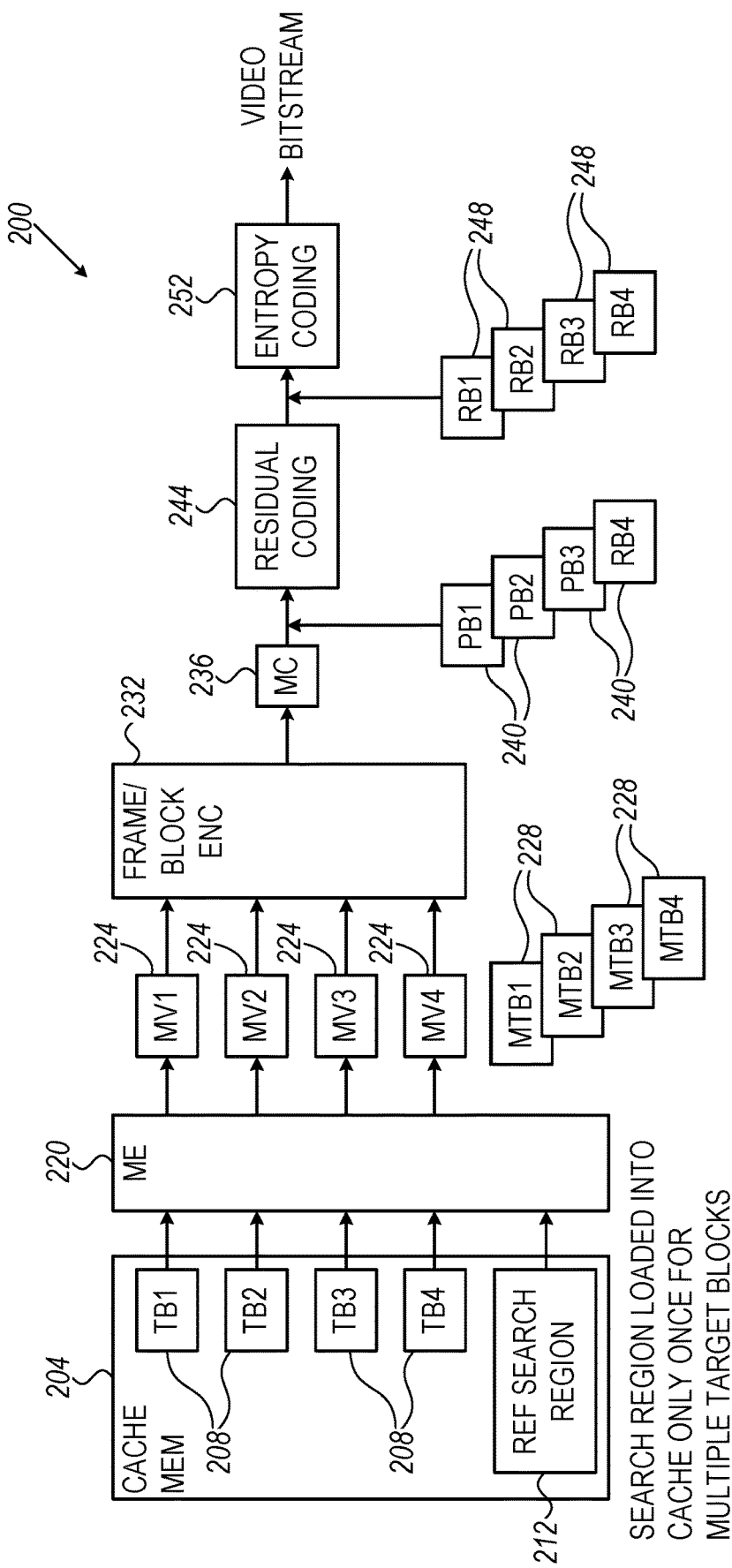
FIG. 3 is a block diagram that schematically illustrates a partial data flow in a video encoder that performs efficient motion estimation by reusing a reference search region, in accordance with an embodiment that is described herein.

FIG. 3 is a block diagram that schematically illustrates a partial data flow in a video encoder 200 that performs efficient motion estimation by reusing a reference search region, in accordance with an embodiment that is described herein.

Video encoder 200 may be used, for example, in implementing video encoder 44 of video encoding system 20 of FIG. 1, based, for example, on the block diagram of video encoder 100 in FIG. 2.

Video encoder 200 comprises a cache memory 204, a ME module 220, a frame/block encoder 232, a MC module 236, a residual coding module 244 and an entropy coding module 252. Some of these elements correspond to same or similar elements in FIGS. 1 and 2. For example, cache memory 204 corresponds to cache memory 32 of FIG. 1. As another example, ME 220 corresponds to ME 60 of FIG. 1 and to ME 120 in FIG. 2. In describing FIG. 3, it is assumed that video encoder 200 comprises a processor (e.g., processor 24—not shown) that executes at least part of the data flow.

In FIG. 3, the processor loads into cache memory 204 four TBs 208 denoted TB1 . . . TB4, and a search region 212 in a reference frame. Target blocks TB1 . . . TB4 belong to four different target frames that all correspond to the same reference frame (in a DPB such as DPB 108). Moreover, TB1 . . . TB4 have the same block-location in the target frames.

In some embodiments, after the processor loads search region 212 and target blocks TB1 . . . TB4 into cache memory 204, ME 220 searches for respective matching blocks 228 (denoted MTB1 . . . MTB4) for TB1 . . . TB4, within search region 212. The ME produces motion vectors 224 (denoted MV1 . . . MV4) between MTB1 . . . MTB4 and TB1 . . . TB4, respectively. In some embodiments, only after ME concludes using search region 212 for all (or at least two) of TB1 . . . TB4, the processor loads another search region to cache memory 204.

A frame/block encoder 232, makes decisions for optimally using the MV1 . . . MV4, e.g., for achieving high compression ratio. For example, some MVs may be merged to represent larger blocks.

MC 236 produces for TB1 . . . TB4 respective Inter-predicted blocks 240 denoted PB1 . . . PB4. Residual coding module 244 produces for TB1 . . . TB4 respective residual blocks 248 denoted RB1 . . . RB4, by calculating the difference between each target block TBi and an Inter-predicted block PBi (i=1 . . . 4) found by ME 220. The calculations carried out by MC 236 and residual coding module 244 may be performed separately for each target block, or in parallel.

Entropy coding module 252 compresses and encodes the residual blocks to produce the formatted output video bit-stream, as described above.

The video encoding system configuration shown in FIG. 1 and the video encoder configurations shown in FIGS. 2 and 3 are example configurations, which are chosen purely for the sake of conceptual clarity. In alternative embodiments, any other suitable video encoding system and video encoder configurations can also be used. Elements that are not necessary for understanding the principles of the present invention, such as various interfaces, addressing circuits, timing and sequencing circuits and debugging circuits, have been omitted from the figure for clarity.

Some elements of video encoders 44, 100 and 200, such as ME coprocessor 72 and ME 60, ME 120 and ME 220, may be implemented in hardware, e.g., in one or more Application-Specific Integrated Circuits (ASICs) or FPGAs. Additionally or alternatively, ME coprocessor 72 and/or ME 60, ME 120 and ME 220 can be implemented using software, or using a combination of hardware and software elements. External memory 36 may comprise any suitable type of memory using any suitable storage technology such as a Random Access Memory (RAM), a Dynamic RAM (DRAM), a nonvolatile memory such as a Flash memory, or a combination of multiple memory types. Cache memory 32 may comprise any suitable type of memory such as, for example, a high-speed Static RAM (SRAM). Alternatively, the cache memory may comprise a DRAM that is faster than external memory 36.

In some embodiments, some of the functions of each of video encoders 44, 100 and 200, may be carried out by a general-purpose processor, e.g., processor 24, coprocessor 72 or both, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 4:
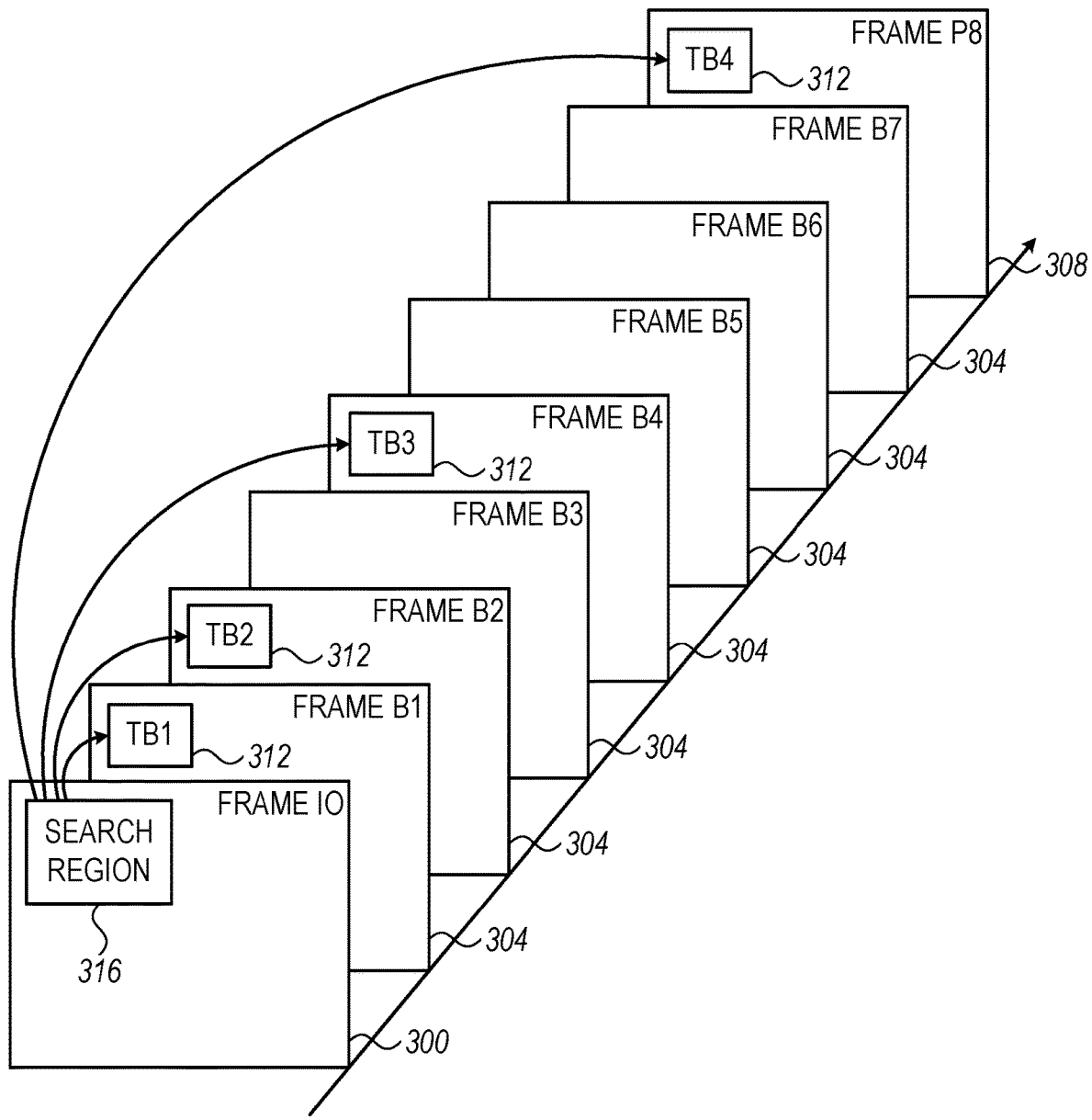
FIG. 4 is a diagram that schematically illustrates a search region being reused in multiple ME search operations for multiple target blocks, in accordance with an embodiment that is described herein.

Reusing a Search Region for Multiple Target Blocks in Frames of a Group of Pictures FIG. 4 is a diagram that schematically illustrates a search region being reused in multiple ME search operations for multiple target blocks, in accordance with an embodiment that is described herein.

FIG. 4 depicts an example Group of Pictures (GOP) comprising nine video frames. The disclosed embodiments are not confined to this GOP, and are also applicable to any other suitable GOP structures.

In the present example, the GOP comprises a key frame 300 denoted I0, followed by seven Bi-directional predicted frames 304 denoted B1 . . . B7, and terminated with a predicted frame 308 denoted P8. The frames in the GOP of FIG. 4 may be encoded using each of video encoding system 20, video encoder 100 and video encoder 200.

In the present example, it is assumed that processor 24 executes video encoder 44 with ME 60. The embodiments described below are equally applicable to video encoder 100 with ME 124, and to video encoder 200 with ME 220.

In FIG. 4, it is assumed that frame I0 has already been encoded as an Intra frame, and that the corresponding reconstructed frame resides in DPB 108, in external memory 36. In the example of FIG. 4, it is further assumed that frame I0 serves as a reference frame for multiple target frames—B1, B2, B4, and P8. Moreover, I0 does not serve as a reference frame for any other frame in the GOP.

In frames B1, B2, B4, and P8, target blocks 312 denoted respectively TB1, TB2, TB3 and TB4 are being encoded, using frame I0 as a reference frame. In some embodiments, a common search region 316 in I0 is used for applying ME search operations for each of TB1, TB2, TB3 and TB4. Search region 316 may be selected beforehand in various ways, e.g., using a search region having a predefined size. Alternatively, processor 24 may select the size of the search region using any suitable method, e.g., in accordance with the most distant target frame relative to the reference frame (e.g., P8).

In some embodiments, before performing ME search operations for TB1 . . . TB4, processor 24 loads search region 316 and TB1 . . . TB4 into cache memory 32. ME 60 (or one of ME 124 and ME 220) performs multiple ME operations in searching for a matching block for each of TB1 . . . TB4 in search region 316.

In some embodiments, processor 24 comprises multiple processing cores. In such embodiments, the processing cores may execute multiple ME operations for multiple TBs among TB1 . . . TB4 in parallel. For example, when processor 24 comprises a four-core processor, four ME search operations for all TB1 . . . TB4 can be executed in parallel. In alternative embodiments, ME 60 performs ME search operations for TB1 . . . TB4 sequentially in any suitable order. In other alternative embodiments, the processing cores may perform multiple ME search operations, in parallel, to a partial subset of TB1 . . . TB4 that contains at least two TBs.

The important point is that the same search region 316 is reused for multiple target blocks among TB1 . . . TB4. This reduces the rate of loading search regions into the cache memory and reduces the cache-miss rate.

In some embodiments, search region 316 is implemented as a sliding window when proceeding to a subsequent block-location of the target blocks. Thus, a stripe of blocks is virtually added on one side and removed from the opposite side of the current search region, horizontally and/or vertically, depending on the scanning direction to the next block-location.

Note that the MVs produced by ME 60 for TB1, TB2 and TB3 in the B-frames B1, B2 and B4 are not final because they are based only on a previous reference frame. For each of these TBs, final MVs will be estimated by ME 60 when relevant reference frames become available in the DPB, and then the encoding of TB1 . . . TB4 can be completed.

The method of reusing a single search region for multiple target blocks before moving to another search region is not limited to a search region in a key frame. This method may be applied similarly to search regions in other reference frames that are each ME searched for multiple target blocks. An example in which the entire GOP is encoded with such search region reuse will be described in detail below, with reference to FIGS. 6A-6F.

Figure 5:
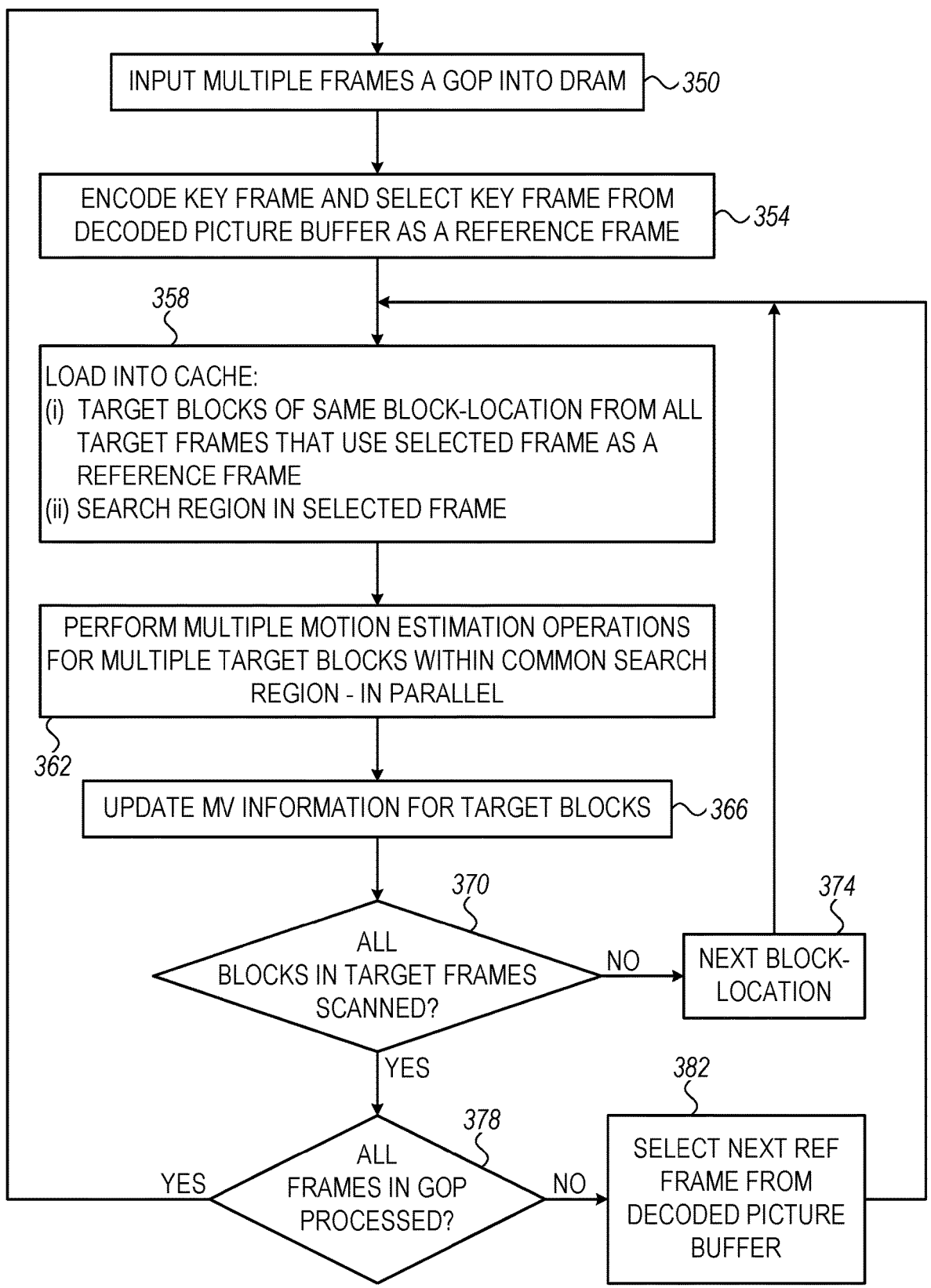
FIG. 5 is a flow chart that schematically illustrates a method for video encoding using an efficient ME that reuses cached reference information, in accordance with an embodiment that is described herein.

FIG. 5 is a flow chart that schematically illustrates a method for video encoding using an efficient ME that reuses cached reference information, in accordance with an embodiment that is described herein.

The method will be described as executed by processor 24 and ME 60 implementing video encoder 44 of FIG. 1. A DPB (e.g., such as DPB 108) is assumed to be implemented in external memory 36. The method is similarly applicable to video encoder 100 with ME 124 of FIG. 2, and to encoder 200 with ME 220 of FIG. 3.

The method begins with processor 24 receiving multiple video frames comprising a GOP in external memory 36, at an input step 350. In the present example, the GOP structure is depicted in FIG. 4 above and is given by the sequence of frames {I0, B1 . . . B7, P8}.

At a key frame encoding step 354, processor 24 encodes frame I0 using Intra-encoding mode, and stores the reconstructed version of the key frame in the DPB. Further at step 354, processor 24 selects the reconstructed key frame in the DPB to serve a reference frame.

At a cache loading step 358, processor 24 identifies the target frames that use the selected reference frame. The processor scans the target blocks of the identified target frames in any suitable order, and for each block-location loads from external memory 36 into cache memory 32 (i) multiple target blocks of the current block-location in the respective target frames, and (ii) a corresponding search region from the selected reference frame.

At a motion estimation step 362, processor 24 executes ME 60 to perform multiple ME search operations for the multiple cached target blocks within the cached search region. In the present example, processor 24 comprises multiple processing cores, and ME 60 performs the multiple ME search operations in parallel using the respective multiple processing cores.

At a MVs updating step 366, processor 24 produces and stores MV information for target blocks for which no MVs have yet been produced, and updates MV information for target blocks for which MVs have been previously produced relative to another reference frame. At a block-loop management step 370, processor 24 checks whether all the target blocks in the currently processed target frames have been scanned, and if not, the processor selects a subsequent block-location at a block-location selection step 374, and loops back to step 358 to load into the cache memory subsequent target blocks and a corresponding search region. Otherwise, the processor proceeds to a GOP termination step 378, to check whether all the frames in the GOP have been processed. When the GOP still has unprocessed frames, processor 24 selects a subsequent reference frame from the DPB at a reference frame selection step 382, and loops back to step 358. Otherwise, the entire frames in the GOP have been encoded and the processor loops back to step 350 to input a subsequent GOP for encoding.

Example of Encoding Frames in a GOP Using Efficient Motion Estimation

FIGS. 6A-6F are diagrams that schematically illustrate a method for encoding frames in a GOP, wherein each reference frame serves multiple target frames in performing motion estimation, in accordance with an embodiment that is described herein.

The GOP in FIGS. 6A-6F, comprises frames {I0, B1 . . . B7, P8}, as depicted, for example, in FIG. 4 above. A frame that was encoded and reconstructed that can serve as a reference frame is marked in the figures using a dotted-line box. The arrows in FIGS. 6A-6F point from a reference frame to the relevant target frames. The structure of the GOP in FIGS. 6A-6F including the dependencies among the GOP frames is also referred to as a B-pyramid or hierarchical B prediction structure.

The method will be described as executed by processor 44 running video encoder 44 with ME 60. The method is similarly applicable to video encoder 100 with ME 124 and to video encoder 200 with ME 220. In describing the method, it is assumed that a DPB (e.g., DPB 108) resides in external memory 36.

The method is described mainly at a frame level, for clarity, even though the video encoding flow is essentially block-based.

Figure 6A:
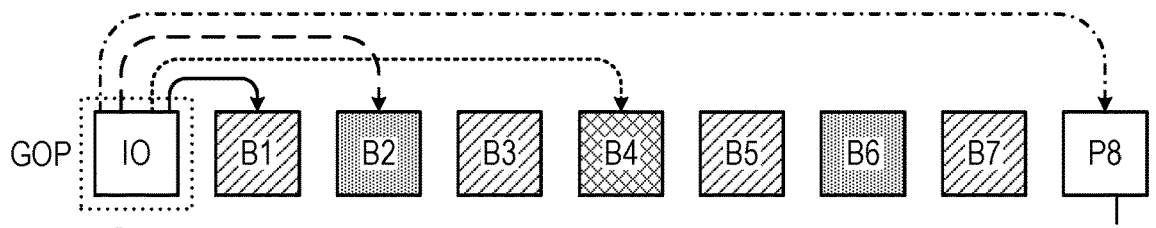
FIGS. 6A-6F are diagrams that schematically illustrate a method for encoding frames in a GOP, wherein each reference frame serves multiple target frames in performing motion estimation, in accordance with an embodiment that is described herein.

The method begins in FIG. 6A, with processor 24 encoding the key frame I0. The processor encodes I0 in Intra-encoding mode, which requires no reference to any other frame. After encoding I0, processor 24 decodes the encoded frame to produce a reconstructed frame denoted I0r, and stores I0r in the DPB.

Unlike conventional video encoding that would use I0r as a reference frame for encoding multiple (four in this example) target blocks in target frames B1, B2, B4 and P8 at different respective times, in the present embodiment, processor 24 uses I0r as a reference frame for at least two target frames among B1, B2, B4 and P8, concurrently.

Processor 24 thus performs multiple ME operations for multiple target blocks in B1, B2, B4 and P8 using a common reference search region in I0r. Note that after processing the current target frames B1, B2, B4 and P8, only P8 can be fully encoded because P8 depends only on the reference frame I0r. Processor 24 saves the motion estimation results (e.g., MVs) of B1, B2 and B4 until performing motion estimation with reference frames other than I0r.

Reusing a search region for multiple target blocks offers several advantages over conventional schemes. First, since only one search region is required at a time, the cache memory footprint can be reduced, e.g., by half, compared to a conventional video encoder that loads two search regions concurrently, and the cache memory bandwidth is improved. In general, the footprint gain depends on the number of reference frames used in a conventional video encoder for encoding a target frame. Second, multiple ME search operations may be carried out in parallel, which reduces latency in ME calculations. Another advantage relates to temporal information across multiple frames that can be extracted and used for improving encoding efficiency, as will be described below.

Figure 6B:
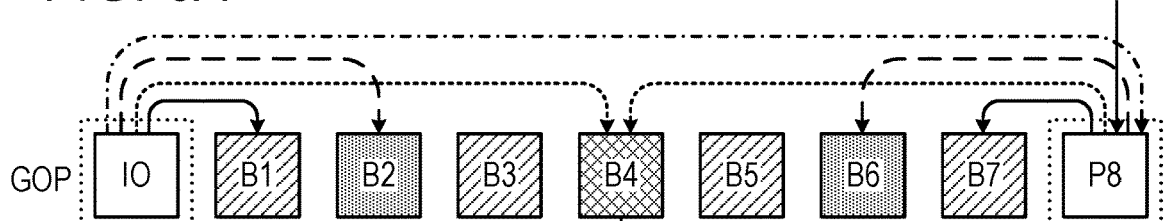

In FIG. 6B, after encoding P8, processor 24 decodes the encoded P8, produces a corresponding reconstructed frame denoted P8r and stores P8r in the DPB. At this stage, P8r can serve as a reference frame for encoding multiple frames B4, B6 and B7. P8r may possibly serve as a reference frame for a future P-frame in a subsequent GOP, as well. In an embodiment, before encoding B4, processor 24 performs multiple ME search operations for target blocks in B4, B6 and B7, with corresponding search regions in P8r. MVs for B4 are now available from both I0r and P8r and processor 24 completes the encoding of B4. The processor then produces a reconstructed frame B4r and stores it in the DPB, as described above.

Figure 6C:
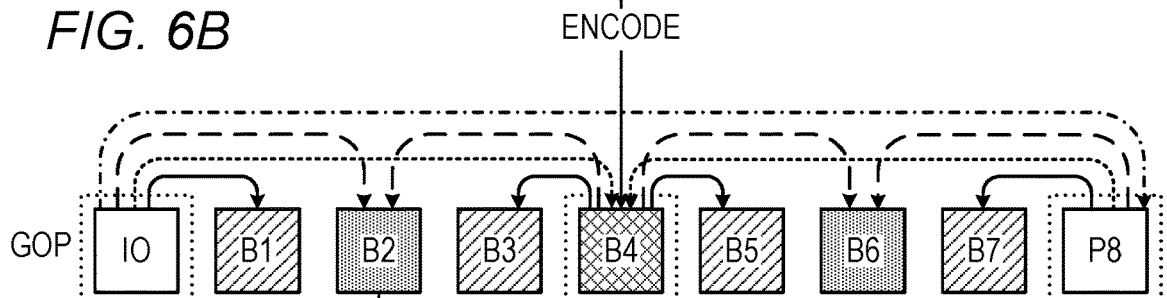

In FIG. 6C, frame B4r serves as a reference frame for encoding frames B2, B3, B5 and B6. Before encoding B2, processor 24 performs multiple ME search operations for target blocks in B2, B3 B5 and B6, with corresponding search regions in frame B4r. Since all the required MVs are now available for B2, processor 24 completes encoding B2 and produces a corresponding reconstructed frame denoted B2r in the DPB.

Figure 6D:
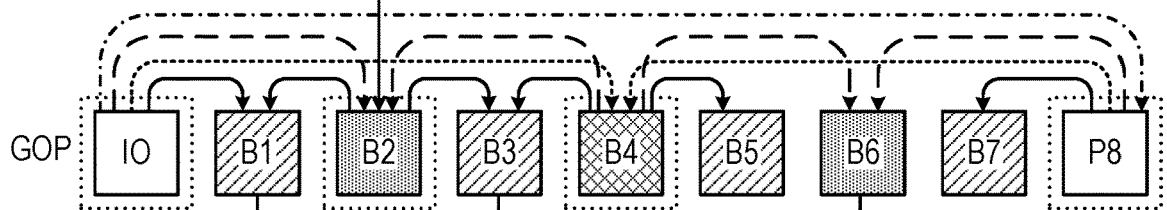

In FIG. 6D, frame B2r serves as a reference frame for encoding B1 and B3. Processor 24 performs ME operations for both B1 and B3 using B2r as a reference frame. Processor 24 then completes the encoding of frames B1 and B3. In some embodiments, processor 24 encodes B1 and B3 in parallel. Since all MVs for B6 are now available, processor 24 completes the encoding of B6, produces a reconstructed frame denotes B6r and stores B6r in the DPB.

Figure 6E:
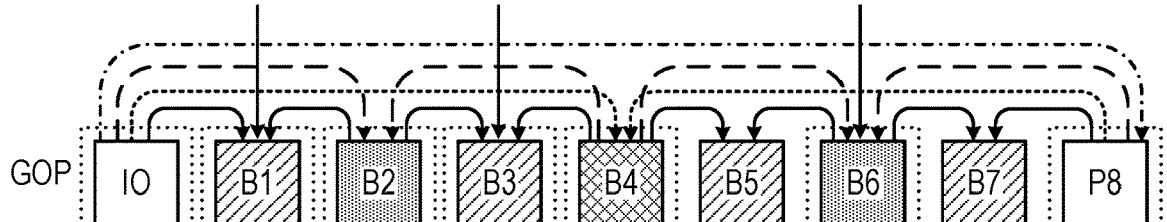

In FIG. 6E, B6r serves as a reference frame for encoding B5 and B7. Processor 24 performs ME operations for both B5 and B7 using B6r as a reference frame. Processor 24 then completes the encoding of B5 and B7. In some embodiments, processor 24 encodes B5 and B7 in parallel.

Figure 6F:
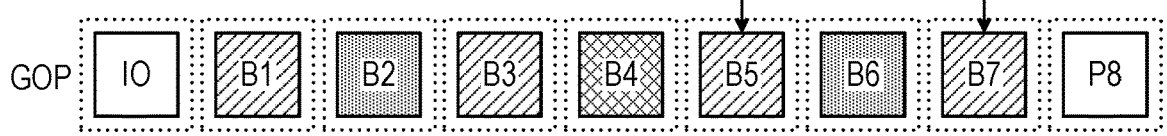

FIG. 6F depicts the encoded frames of the entire GOP, and the method terminates.

Using GOP-Level Temporal Information

Conventional video encoders only utilize temporal information between a target frame and a reference frame. For example, in the GOP structure of FIG. 4, a conventional video encoder performs motion estimation search operations for P8 and for B4 (with I0 serving as a reference frame) at different times, due to memory and bandwidth constraints. Conventional video encoder therefore cannot utilize GOP-level temporal information at affordable complexity.

Valuable GOP-level temporal information is, however, not confined to just a target frame and its reference frame(s), as will be described below.

Figure 7:
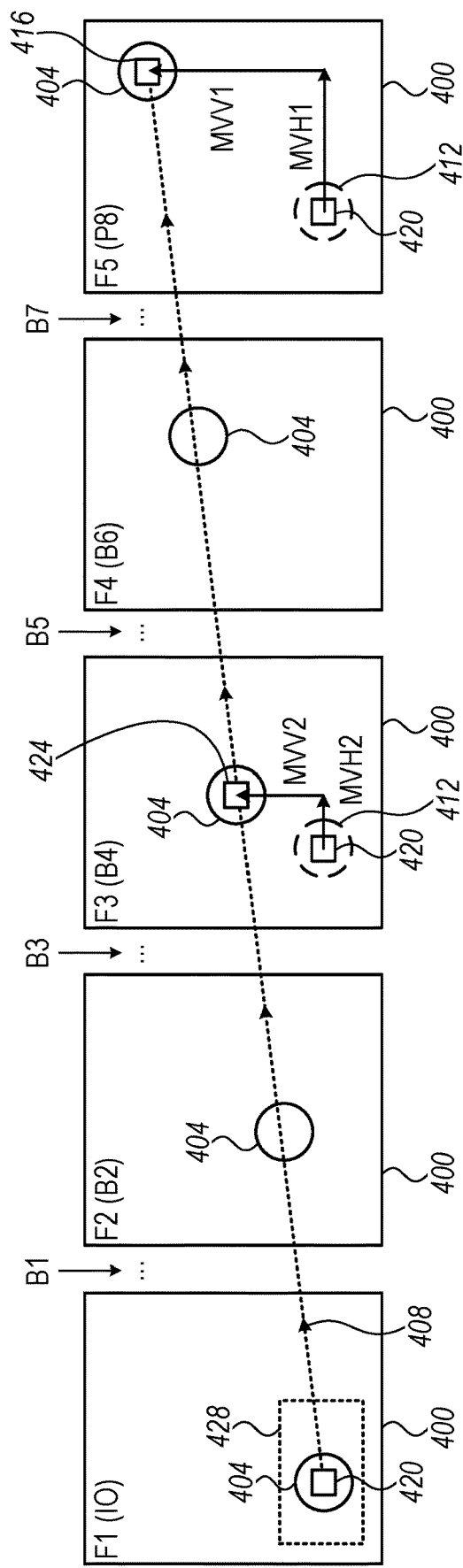
FIG. 7 is a diagram that schematically illustrates a method for using GOP-level temporal information for improving motion estimation performance, in accordance with an embodiment that is described herein.

FIG. 7 is a diagram that schematically illustrates a method for using GOP-level temporal information for improving motion estimation performance, in accordance with an embodiment that is described herein.

FIG. 7 depicts five frames 400 denoted F1 . . . F5, belonging to a common GOP. In the present example, the GOP in FIG. 7 has the same structure as the GOP depicted in FIG. 4. As such, frame F1 is a key frame corresponding to frame I0, frames F2, F3 and F4 are B-frames corresponding respectively to B2, B4 and B6, and F5 is a P-frame corresponding to P8 of FIG. 4. Frames B1, B3, B5 and B7 are omitted for clarity.

In the example of FIG. 7, a circle-shaped object 404 appears in both frame I0 and P8. Object 404 is therefore likely to appear also in the frames in between, possibly exhibiting a smooth movement along the frames. Dotted line 408 represents a movement of object 404 along a straight line, at a constant speed between the left-lower corner of frame F1 to the right-upper corner of frame F5. Objects 412 in frames F4 and F5 represent the original object 404 as positioned in frame F1.

Target block 416 in frame F5 has a matching block 420 in frame F1 at a horizontal offset (horizontal component of the motion vector—MVH1) of NH1 pixels and a vertical offset (vertical component of the motion vector—MVV1) of length NV1, e.g., in units of pixels or any other length units. Block 420 (or a block close to 420) in frame F1 is therefore likely to match a target block 424 in frame F3 with a horizontal offset (horizontal component of the motion vector—MVH2) of about NH2=NH1/2 pixels and a vertical offset (vertical component of the motion vector—MVV2) of length about NV2=NV1/2 pixels. Note that target block 404 is confined to fixed block-locations in frame F4.

In some embodiments, the processor exploits temporal information across multiple frames. For example, the processor may use MVs calculated for target blocks in P8 to guide motion search operations for target blocks in frames B1, B2 and B4.

In an example embodiment, given MVH1 and MVV1 of target block 416 in frame F5, and assuming that (i) F3 is a middle frame half-way between frames F1 and F5 and (ii) object 404 moves approximately linearly at an approximately constant velocity from F1 to F5, the processor may estimate MVH2 and MVV2 as having half the lengths of MVH1 and MVV1, respectively. In some embodiments, the processor then uses the estimated MVs to guide the ME search operation for target block 424 in frame F3, e.g., by selecting, based on the estimated MVs a search region 428 centered about (or close to) block 420 in frame F1 that matches target block 416 in F5. The guided motion estimation typically finds a best-matching block in F1 much faster than an unguided search would, and using less block-matching operations. Moreover, the resulting matching block for the farthest frame (F5 in this example) serves as a search limit for in between frames (e.g., F3), which may result in a smaller matching error. This guided motion estimation significantly increases the encoding efficiency by either finding accurate MVs that match the actual movement, at lower computational cost, or finding more accurate prediction blocks at similar computational cost, or a combination thereof. In a similar manner, MVs calculated for B6 may be used for guided ME in processing B5, and MVs calculated for B4 may be used for guided ME in processing B3.

In the example of FIG. 7, a smooth linear movement of an object at a constant speed was assumed. This, however, is not mandatory, and in alternative embodiments, other movement models can also be used. For example, in an embodiment, based on MVs estimated for more than two frames, a movement along a nonlinear line can be estimated. As another example, using frame times, accelerated or decelerated movement can be estimated.

The embodiments described above are given by way of example, and other suitable embodiments can also be used. For example, in the embodiments described above, motion estimation search operations are performed using search regions in reconstructed frames. In alternative embodiments, for example when higher level of parallel operation is required, the motion estimation may be performed on the input raw frames. This allows greater flexibility in the order of performing motion estimation search operations, because the raw frames of the GOP are initially available. In some embodiments, the processor first estimates, using a motion estimation search operation, a MV for a target block using a search region in a raw frame serving as a reference frame. After the processor produces a reconstructed frame corresponding to the raw frame, the processor calculates a refined version of the MV based on the produced reconstructed frame, thus improving the accuracy of the MVs.

The method of FIG. 7 may be executed, for example, when the processor identifies an object in a reference frame that appears also in a distant frame, for calculating MVs in a frame in between.

In some of the embodiments described above, a B-pyramid or hierarchical B prediction GOP structure is utilized. Consider another GOP structure, in which multiple B-frames use the same preceding and following frames as reference frames. In a non-limiting example, these non-used for reference B-frames may comprise all the B-frames between two consecutive P-frames: P0 and P1. The gain of reusing a common search region in this case may be even higher than in the B-pyramid case, because motion estimation may be performed for multiple (or even all of the) B-frames in the GOP in parallel, as well as for P1 frame—because they all use the P0 frame as a reference frame. Following this, prediction for multiple (or even all of the) B-frames using P1 as reference can also be performed jointly. Moreover, encoding the B-frames after performing motion estimation may also be parallelized.

In the embodiments described above, a full-sized block was mainly assumed. In alternative embodiments, motion estimation search operations with search region reuse may be similarly applied to sub-blocks in accordance with block partitions supported.

Although, in the embodiments described above, MVs produced using the efficient motion estimation methods are used mainly for producing a compressed video bitstream, in alternative embodiments these MVs may be used for other purposes. For example, the MVs may serve as metadata for performing any suitable video processing or analysis, e.g., video transcoding.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A video processor, comprising:
   a memory;
   a cache memory; and
   a processor coupled to the memory and to the cache memory and configured to:
      store in the memory (i) multiple raw frames belonging to a Group of Pictures (GOP) to be processed, and (ii) one or more reference frames;
      load from the memory into the cache memory (i) multiple target blocks having a same block-location in respective raw frames associated with a common reference frame, and (ii) a common search region in the common reference frame; and
      after loading the multiple target blocks and the common search region into the cache memory, and before selecting another search region, apply at least two motion estimation operations using at least two of the target blocks and the common search region in the cache memory, to estimate respective at least two Motion Vectors (MVs).

2. The video processor according to claim 1, wherein the processor is configured to produce a video bitstream by applying residual coding to the at least two of the target blocks and corresponding predicted blocks determined based on the at least two MVs.

3. The video processor according to claim 1, wherein the processor is configured to complete encoding the at least two of the target blocks after performing the at least two motion estimation operations for the at least two of the target blocks using search regions belonging to other respective reference frames.

4. The video processor according to claim 1, wherein the processor comprises multiple processing cores, and wherein the multiple processing cores are configured to apply, in parallel, multiple motion estimation operations among the at least two motion estimation operations.

5. The video processor according to claim 1, wherein the processor is configured to apply first and second motion estimation operations among one or more of the at least two motion estimation operations, in the common search region, at different respective first and second times.

6. The video processor according to claim 1, and comprising a motion estimation coprocessor coupled to the processor, and wherein the motion estimation coprocessor is configured to offload the at least two or more motion estimation operations from the processor.

7. The video processor according to claim 1, wherein the processor is configured to calculate a first MV for a first target block in a first target frame relative to the common search region in the common reference frame, to select based on the first MV a search region in the common reference frame for a second target block in a second target frame closer to the reference frame than the first target frame, and to calculate a second MV for the second target block by performing a guided motion estimation search in the selected search region.

8. The video processor according to claim 1, wherein the processor is configured to select the common search region in a raw frame serving as reference frame, to estimate respective MVs for the at least two of the target blocks in the common search region in the raw frame, to produce a reconstructed frame corresponding to the raw frame, and to calculate refined versions of the MVs based on the produced reconstructed frame.

9. A method, comprising:
storing in a memory (i) multiple raw frames belonging to a Group of Pictures (GOP) to be processed by a video processor, and (ii) one or more reference frames;
loading from the memory into a cache memory to which the processor is coupled (i) multiple target blocks having a same block-location in respective raw frames associated with a common reference frame, and (ii) a search region in the common reference frame; and
after loading the multiple target blocks and the common search region into the cache memory, and before selecting another search region, applying at least two motion estimation operations using at least two of the target blocks and the common search region in the cache memory, to estimate respective at least two Motion Vectors (MVs).

10. The method according to claim 9, and comprising producing a video bitstream by applying residual coding to the at least two of the target blocks and corresponding predicted blocks determined based on the at least two MVs.

11. The method according to claim 9, and comprising completing encoding the at least two of the target blocks after performing the at least two motion estimation operations for the at least two of the target blocks using search regions belonging to other respective reference frames.

12. The method according to claim 9, wherein the processor comprises multiple processing cores, and wherein applying the at least two motion estimation operations comprises applying by the multiple processing cores, in parallel, multiple motion estimation operations among the at least two motion estimation operations.

13. The method according to claim 9, wherein applying the at least two motion estimation operations comprises applying first and second motion estimation operations among one or more of the at least two motion estimation operations, in the common search region, at different respective first and second times.

14. The method according to claim 9, wherein the video processor comprises a motion estimation coprocessor coupled to the processor, and wherein the method comprising offloading the at least two or more motion estimation operations from the processor, by the motion estimation coprocessor.

15. The method according to claim 9, and comprising calculating a first MV for a first target block in a first target frame relative to the common search region in the common reference frame, selecting based on the first MV a search region in the common reference frame for a second target block in a second target frame closer to the reference frame than the first target frame, and calculating a second MV for the second target block by performing a guided motion estimation search in the selected search region.

16. The method according to claim 9, and comprising selecting the common search region in a raw frame serving as reference frame, estimating respective MVs for the at least two of the target blocks in the common search region in the raw frame, producing a reconstructed frame corresponding to the raw frame, and calculating refined versions of the MVs based on the produced reconstructed frame.

* * * * *